Dec. 27, 1938.  B. BISCHOF  2,141,166
HYDRAULIC TRANSMISSION
Filed Aug. 20, 1934  3 Sheets-Sheet 1
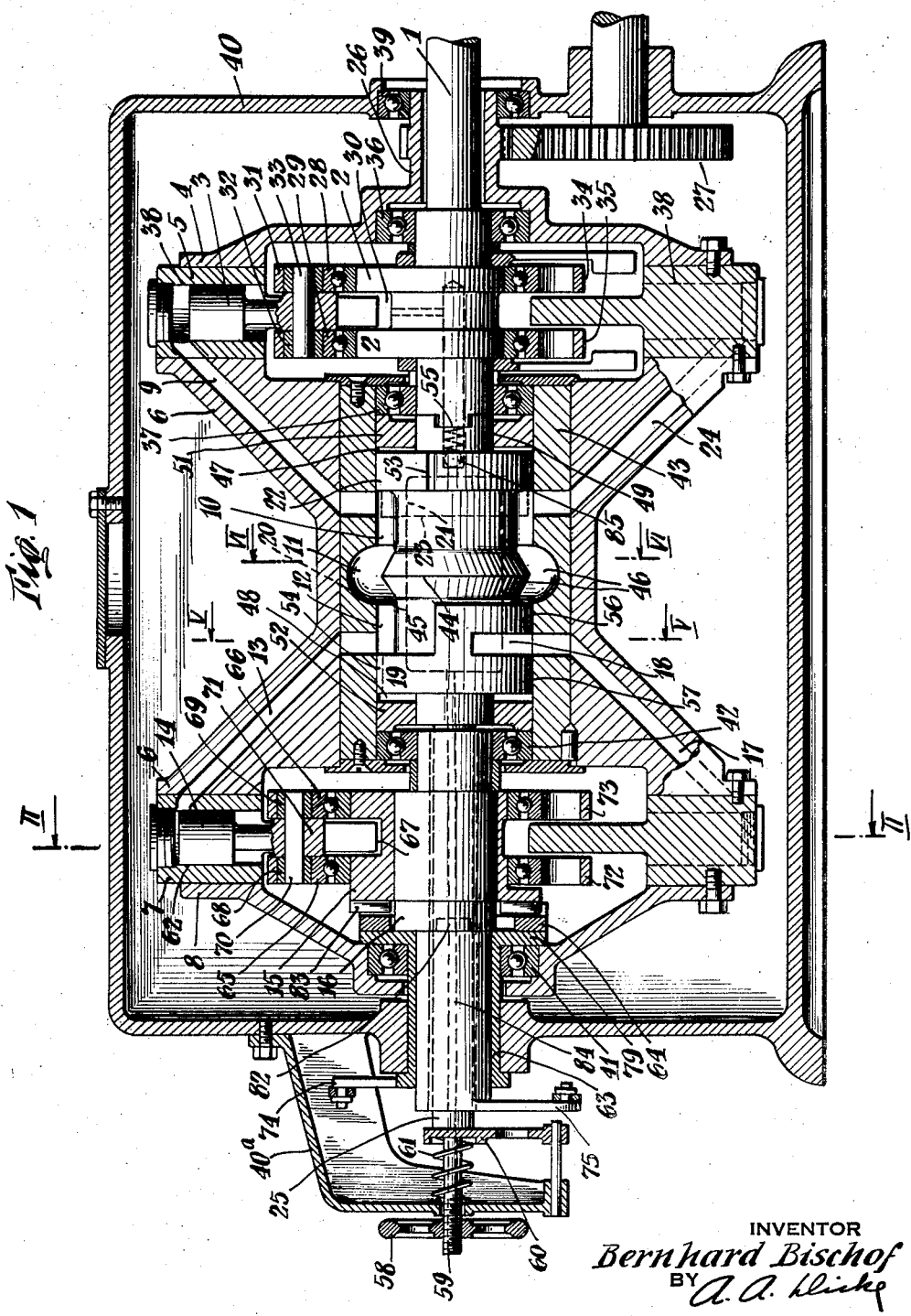
INVENTOR
Bernhard Bischof
BY
ATTORNEY Dec. 27, 1938.  B. BISCHOF  2,141,166
HYDRAULIC TRANSMISSION
Filed Aug. 20, 1934   3 Sheets-Sheet 2
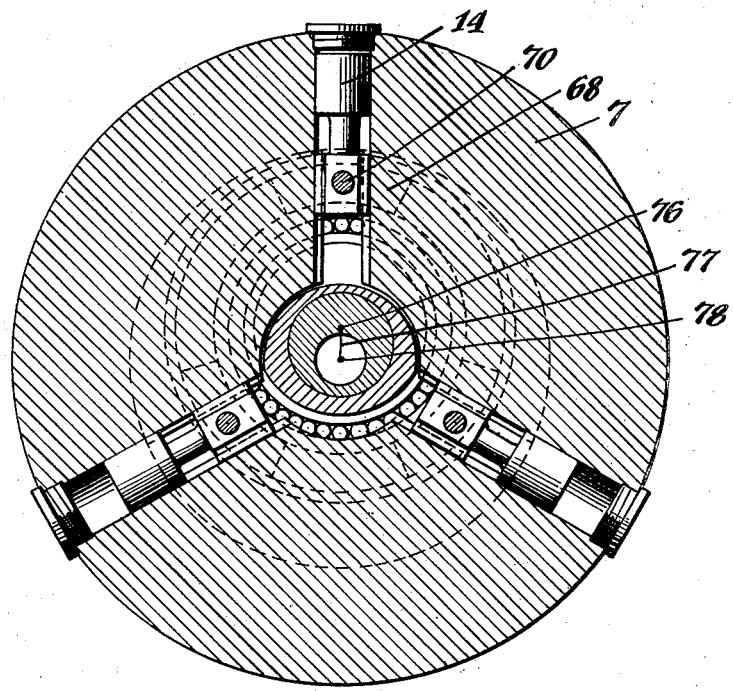
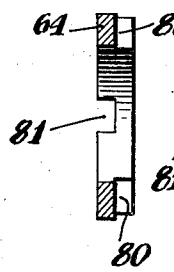 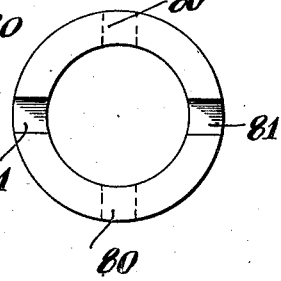 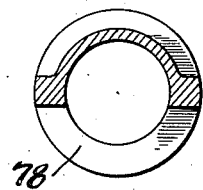 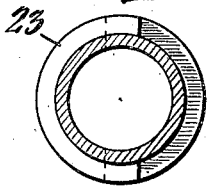
INVENTOR
Bernhard Bischof
BY
ATTORNEY

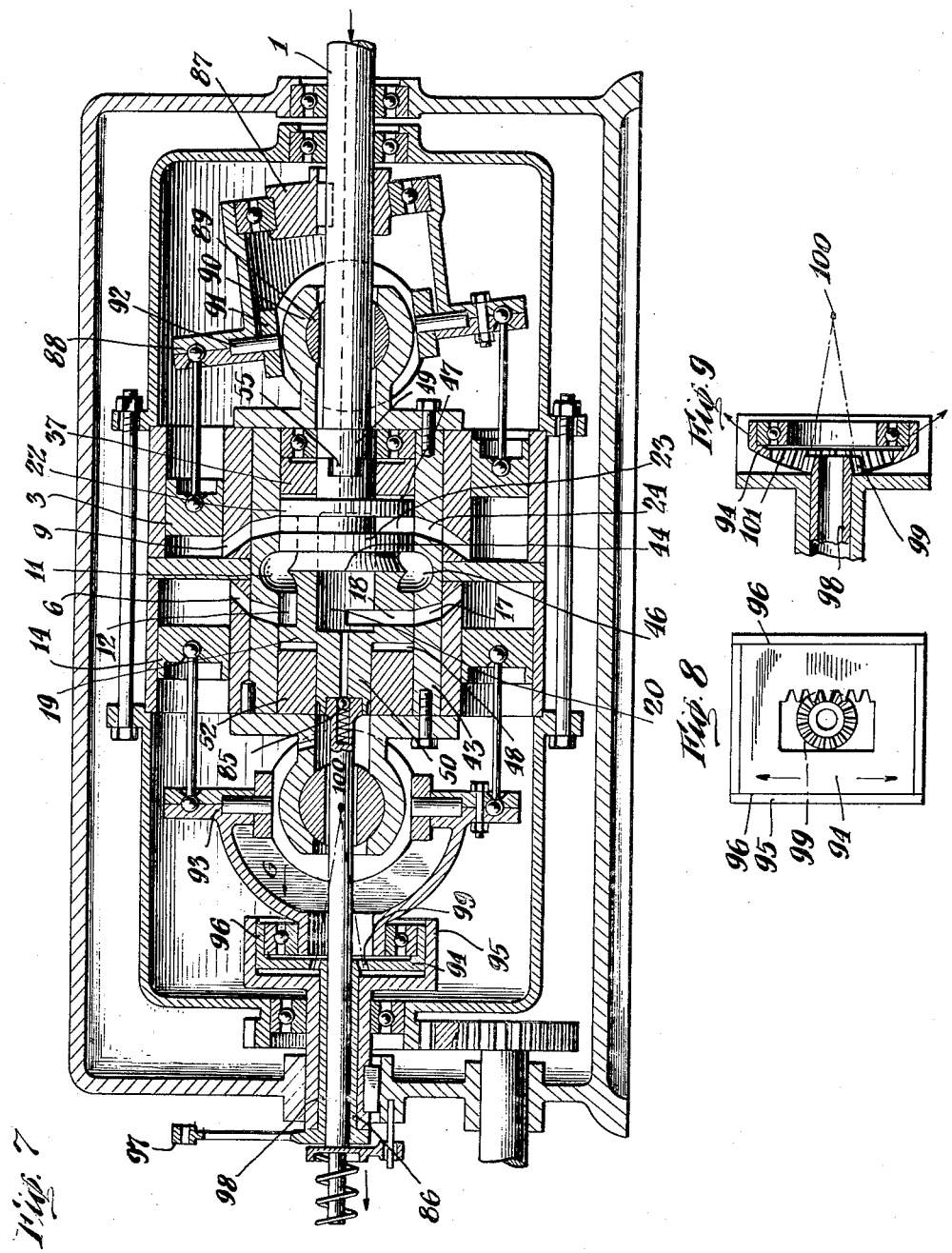

Patented Dec. 27, 1938

2,141,166

UNITED STATES PATENT OFFICE 2,141,166

HYDRAULIC TRANSMISSION

Bernhard Bischof, Kiel, Germany

Application August 20, 1934, Serial No. 740,669
In Germany August 23, 1933

15 Claims. (Cl. 60—53)

This invention relates to a hydraulic piston gear with rotary casing for hydraulic-mechanical power transmission, and it is an object of the invention to generally improve such devices, particularly such in which the drives of the pump pistons and motor pistons are situated in the axis of rotation of the casing. It differs from the known driving gears of similar type in that for controlling the liquid two rotary slide valves are employed which are arranged in the axis of rotation of the casing, bear tightly against one another with one end face and form together with surrounding casings two separate compartments. These slide valves are further so arranged, that they cannot turn relative to their associated pump crank or motor crank. The correct position of the valves relative to their cranks can be effected by direct coupling or, in the case of adjustable cranks, by a separate rod system.

An additional feature of the invention relates to the design of a hydraulic gear in such a form that the same comprises three co-axial casings, viz., a pump cylinder casing, a distributor casing and a motor casing, the said distributor casing having in its central inner space no shafts, eccentrics or elements of any other kind which transmit the driving force or serve to support other casing parts, so that the entire central space of the distributor casing is available for the sole purpose of accommodating the rotary slide valves, which in the case of this construction can be furnished with that form which, with the smallest possible diameter, offers the greatest facilities for the distribution of the liquid and reduces the losses by leakage to a minimum.

An additional advantage of the arrangement of the slide valves, according to the invention, in their own distributor casing resides in a very considerable reduction in the frictional work, as the latter is made up of two factors, viz., the pressure which produces the friction and the speed with which the contacting parts move one against the other. An increase in the diameter will result in an increase of each of these factors, so that the values of the frictional work increase in the second power with the diameter of the slide valves. In dealing with these factors it must also be taken into account that with greater diameter the length of the slide valves must also be increased so that the frictional work increases almost in the third power in relation to the diameter of the slides. This clearly reveals the great advantage of the invention—that of being able to make the slide valves, the inner space of which is merely traversed by the liquid and does not contain any fixed parts, so small that the losses due to friction and leakage are reduced to an absolute minimum.

A still further feature of the invention consists in the provision of a hydraulic gear of such nature that one or both cylinder barrels, in the radial borings of which there are provided pistons which pump the liquid towards the outside or suck up the same inwards, are mounted to be rotatable about double eccentrics, the eccentricity of which is made to be adjustable, the outer eccentric carrying two bearings between which there is an intermediate space that is amplified by a recess in the outer eccentric. The cross-head slideways are enabled to project into the total space thus formed, it accordingly being accomplished by the invention that the diameters of the cylinder barrels are small, that the passages for the liquid between the barrels and the distributing means, such as slide valves, are short, and that the centrifugal forces are reduced to a minimum.

Other features and objects of the invention will be apparent from the description and drawings.

The advantages of this arrangement consist in very simple construction, a considerably improved efficiency and a reductilon of weight and of space required. It is possible to build gears for high capacities.

Several embodiments of the invention are illustrated by way of example, in the accompanying drawings, in which:—

Fig. 1 shows in longitudinal section an embodiment of the invention in a gear with radial pistons.

Fig. 2 is a section taken along the line II—II of Fig. 1.

Fig. 3 is a section through the clutch which is fitted between the outer eccentric and its bush, in the same sectional plane as Fig. 1.

Fig. 4 is an elevational view of this clutch.

Fig. 5 shows a slide valve in sectional view along the line V—V in Fig. 1.

Fig. 6 shows a slide valve in the sectional plane VI—VI in Fig. 1.

Fig. 7 is a longitudinal section of a modification comprising a gear having pistons disposed parallel to the longitudinal axis.

Fig. 8 shows the adjustment means for the swash plate shown in Fig. 7, viewed in the direction of the arrow G.

Fig. 9 is a longitudinal section through Fig. 8.

In the embodiment illustrated in Fig. 1, the drive of the pistons 3 is effected by a pump shaft 1 through the medium of eccentrics 2. A portion of the output is directly transmitted in the form of torque from the shaft 1 to the casing 4, 5, 6, 7, 8. The pressure liquid passes from the radial pistons 3 through channels 9 into the valve chamber 10, from there through a surrounding valve casing 11 to a chamber 12, and thence through channels 13 to motor pistons 14, the rods of which bear against the stationary eccentric 15. This eccentric 15 is keyed on to a shaft 16. A second torque is exerted on the casing by the reaction of these piston pressures and the casing is rotated. After having performed work in the motor, the liquid passes through channels 17 and through ports 18 of the valve 19 into the inner chamber 20, which communicates with the chamber 21 of the slide valve 22. The driving liquid returns to the pump through ports 23 in the valve 22 and suction channels 24.

In both the pump as well as the motor, each of the channels 9 and 24 on the one hand and 13 and 17 on the other hand becomes alternately suction and pressure channel, depending upon the movement of the pistons and the rotative position of the slide valves 22 and 19 relative to the casing. The pump slide valve 22 is driven by the shaft 1, and the motor valve 19 is fixed by the spindle 25. The eccentrics 15 are radially adjustable to permit the adjustment of the volume of the motor and, therefore, of the circumferential velocity as desired.

The transmission of the output from the casing 8, 7, 6, 5, 4 may be effected by means of spur gears 26, 27, or by a belt pulley or the like.

In order to make the aforesaid operation of the gear perfectly clear the gear will now be described fully with reference to the drawings.

The driving shaft 1 is connected at its one end to the corresponding parts of the driving machine, for example, an electro-motor, internal combustion engine, or the like. This shaft 1 is conducted into the interior of the gear casing and rotates the eccentric 2 firmly connected therewith. This eccentric 2 is surrounded by two anti-friction bearings 28, 29, and is so constructed that between the parts of the eccentric 2 which carry these bearings there is formed a recess 30. On the outer periphery of these bearings there are provided slide members 31, 32 having a boring in which is mounted a crosshead bolt 33 carrying the cross-head, the piston rod and the piston 3. Two rings 34, 35 are provided about the outer periphery of the sliding members.

All of the parts described up to now, viz., the driving shaft 1 with the eccentric 2, the pistons 3 and the parts carrying the pistons, are rotatably mounted by means of bearings 36, 37 in the pump cylinder casing, the axis of the driving shaft 1 coinciding with the longitudinal axis of this casing. The pump cylinder casing contains a plurality of radially directed bores 38 in which the pistons 3 are adapted to move.

On to the pump cylinder casing 5 there is flanged a cover 4, to which there is secured the gear wheel 26 and which carries at its end anti-friction bearings 39, so that the pump cylinder casing is able to rotate together with the cover 4 in the box 40.

The pump cylinder casing 5 is firmly connected to the distributor casing 6 which contains the slide valves, and to the motor cylinder casing 7 which is rotatably mounted by means of the bearings 41, 42 about the motor shaft 16 in the box 40. These three casings, which are firmly screwed together, accordingly constitute a rotatable unit in the form of embodiment shown.

In the distributor casing 6 there are provided passages 9, 13, 17, 24, which communicate at the one end with openings at the outer ends of the bores in the pump cylinder casing 5 and the motor cylinder casing 7, there being one passage for each cylinder.

The said passages open out at their opposite ends into a central cylindrical hollow space which forms the center of the distributor casing 6, and, accordingly, the central point of the gear between the pump cylinder casing 5 and the motor cylinder casing 7. This central space acts as a bearing sleeve for the slide valves. For the sake of convenience in the construction, a separate bearing sleeve 43 of suitable material may also be pressed into the said space. The slide valves are so constructed that they distribute the current of liquid between pump cylinder casing and motor cylinder casing. The pump slide valve 22 is connected with the driving shaft 1 in such a way that this slide valve is compelled always to rotate in unison with the driving shaft 1.

The motor slide valve 19 is firmly connected with the spindle 25 and is firmly held by this spindle against rotation. The two slide valves are co-axial, have a bell-like form, and may be caused to move against each other with their annular end faces in the plane of contact 44, this position being their normal position of operation. In this position their inner spaces form a common chamber, the apertures 18, 23 of which register with certain of the passages in the distributor casing.

In the outer periphery of the slide valves there are provided recesses or cavities 45, which form about a part of the outer periphery of the slide valves a second hollow space 10, 12, which communicates with the remaining passages in the distributor casing. In the outer face of the slide valves there is also provided an annular recess 46 adjacent the plane 44 in which the slides contact. The annular end faces of the slide valves widen out in the plane of contact towards the outside. In the same plane 44 there is also located an annular recess 11 in the distributor casing, so that in this place there is an increase in the size of the outer hollow space.

At the lateral ends of the slide valves an annular hollow space 47, 48 is formed in each case by the fact that the diameter of the cylindrical members 49, 50, which established connection between the shafts and the slide valves, is made to be smaller than the outer diameter of the slides. These cylindrical members are made to fit in exactly sealing fashion in borings in the rings 51, 52. The small annular hollow spaces 47, 48 communicate with each other by means of grooves 53, 54 provided in the outer periphery of the slides, so that oil under pressure which is situated in the outer hollow space 10, 11, 12 of the slide valves penetrates into the spaces 47, 48. The pump slide valve 22 is connected with the driving pump shaft 1, and the motor slide valve 19 is firmly connected with the spindle 25, by means of which it is always held in a certain position in relation to the motor crank 15, 16. The connection of the slide valves with the adjacent parts is such that in the radial direction the slide valves are able to adjust themselves in one co-ordinate plane and to be sealed off against the bearing sleeve (for example, by means of claws 55). Owing to the recesses aforesaid in the outer surface of the slide valves 19, 22 there are formed projectory ledges 56, 57 which constitute the sealing means between the slide valve pressure space 10, 11, 12 and the openings 18, 23 in the slide valves which establish connection between the suction space 20, 21 and the suction passages 17, 24 of the distributor casing 6. As regards this seal, it is important that the sealing faces be pressed one against the other. This is produced automatically by the pressure of the liquid, which on the opposite side of the openings acts laterally on the slide valve by way of the pressure oil flowing out of the pump portion. In order for this purpose to permit of the requisite lateral movement of the slide valves against the bearing sleeve in said co-ordinate plane the cylindrical member 49, which is firmly connected with the slide valve 22, is joined to its shaft by means of the claw 55. The cylindrical member 50 is connected to the resilient spindle 25.

Means are provided (for example, hand wheel 58 and thread 59), which are adapted to shift longitudinally the motor slide valve spindle 25 and the slide valve 19 connected therewith so as to separate the two slide valves 19, 22 in the plane of contact 44, so that in this case a free connection for the liquid is established between the outer and the inner chamber.

At the outer end of the motor slide valve spindle 25 there is provided a plate 60 and, bearing against the same, a spring 61, which bears at its opposite end against the bracket 40a carried by the box 40. By means of this spring 61 it is accomplished that the spindle 25 normally presses the annular end face of the motor slide valve 19 against the end face of the pump slide valve 22, the pressure of this spring sufficing in normal operation to hold the slide valves 19, 22 together despite the oppositely acting forces which occur at the contacting faces of the slide valves owing to the penetration of oil under pressure. To facilitate comprehension it may be remarked that the pressure of this spring 61 which presses the two slide valves one against the other is assisted by the oil pressure which occurs in the annular hollow spaces 47, 48 and likewise tends to press the two slide valves together at their ends.

Firmly connected with the distributor casing 6 is the motor cylinder casing 7 having a plurality of radially disposed cylindrical borings 62 which communicate by apertures at their outer ends with the passages 13, 17 in the distributor casing.

The motor cylinder block 7 is rotatably mounted with the aid of anti-friction bearings 41, 42 about the eccentric 16, through the central boring of which the motor slide valve spindle 25 extends to the outside of the gear. This eccentric 16 carries a second eccentric 15 which is rotatably adjustable about the said first eccentric 16. It will be seen from the drawings that the outer anti-friction bearing 41, which carries the motor cylinder casing, is mounted on a bush or sleeve 63 which is connected with the second eccentric 15 by means of a coupling element 64. The construction of the outer eccentric 15 as regards the arrangement by means of which it carries the piston system is similar to that in the case of the eccentric 2 in the pump cylinder casing, that is to say—between the parts of the eccentric 15 which carry the bearings 65, 66 there is formed a recess 67. On the outer periphery of these bearings there are located sliding members 68, 69 (see also Fig. 2), having a bore in which there is mounted a crosshead bolt 70 carrying the cross-head 71, the piston rod and the piston 14. Two rings 72, 73 surround the sliding members 68, 69 about their outer periphery.

In Figs. 1 and 2, the two eccentrics 15 and 16 are situated in that position in which the eccentricity of each is in exactly the same direction. The degree of eccentricity of the two eccentrics is the same. It will be clear that the two superimposed, relatively rotatable eccentrics must always result in a total eccentricity which is made up of the two single eccentricities and varies dependent on the rotation of the two eccentrics in relation to one another. The position of the two eccentrics in Figs. 1 and 2 shows the maximum total eccentricity in relation to the central longitudinal axis of the gear. This position of the two eccentrics 15, 16 in Fig. 1 showing the maximum eccentricity of both corresponds to that operative condition of the gear in which the motor takes up the maximum quantity of oil upon one revolution. This position of the eccentrics will be referred to hereinafter as their positive position.

The invention provides means, such as levers 74, 75, which are so designed that the two eccentrics 15 and 16 may be adjusted in relation to one another, viz., to the same angular extent but in opposite directions. The result of this adjustment is always such that the outer axis of the outer eccentric 15, designated 76 in Fig. 2, can accordingly always move only in the same plane, which, for example, may also be identical with the plane of the drawings in Fig. 1. The position of the outer axis 76 of the outer eccentric 15 in relation to the axis of the gear is accordingly identical with the total eccentricity of the two eccentrics 15 and 16 and represents, therefore, the crank arm 77 which causes the stroke of the pistons 14.

It will be obvious that with this relative rotation of the eccentrics 15, 16 to the same angular extent in opposition to one another, the outer axis 76 of the outer eccentric may be moved to coincide with the gear axis 78, in which position of regulation the direct drive is secured. The relative rotation of the eccentrics 15, 16 may also take place beyond this position towards the opposite side of the gear axis 78 which may be referred to as the negative position of the eccentrics. The effect of this latter adjustment of the eccentrics 15, 16 will be described later.

At the outer end of the shaft of the inner eccentric 16 and at the outer end of the sleeve 63 of the outer eccentric 15 there are provided means of a suitable kind, such as levers 74, 75, which are so designed that the two eccentrics 15, 16 may be adjusted to the same angular extent in relation to one another but in opposite directions. To obtain this adjustment a special clutch 64 is provided between the sleeve 63 and the outer eccentric 15.

This clutch 64 consists of a ring which is disposed in the space remaining between the outer eccentric 15 and a flange-like extension 79 of the sleeve 63. The ring 64 contains on either side prism-like grooves 80, 81, which are so disposed that the longitudinal axis of the grooves 80 on the one side is located at an angle of 90° in relation to the longitudinal axis of the grooves 81 on the opposite side. The grooves 81 on the one side are engaged by claws 82 which are provided on the side of the flange-like enlargement 79 of the sleeve 63. The prism-like grooves 80 on the opposite side of the ring 64 are engaged by similarly formed claws 83 carried by the outer side face of the outer eccentric 15. This arrangement of the clutch 64 produces the following result:

When the sleeve 63 is rotated to any angular extent, the clutch 64 is necessarily rotated to exactly the same angle. Further, the outer eccentric 15 must also be rotated to the extent of exactly the same angle as the clutch 64, so that the angular movement of the sleeve 63 produces exactly the same rotation of the outer eccentric 15. Since, however, means are provided to ensure that the sleeve 63 can rotate only to the same angular extent as the inner eccentric 16, but in the opposite direction thereto, it is accomplished by means of the clutch 64 that the outer eccentric 15 is also rotated in opposition to the inner eccentric 16.

With this arrangement of the adjustable motor eccentrics in a plane it is sufficient for the motor slide valve 19 to be held firmly in position by any suitable means in order to ensure that this slide valve 19 and the total eccentricity of the motor eccentrics 15, 16 in relation to one another must always be situated at a constant and invariable angle.

Means are provided for filling the gear with oil (drilled hole 84), and there are also additional means consisting, for example, of a safety valve, so that air and oil may be discharged towards the outside. This safety valve 85 is disposed in the axis of the gear so that, in the first place, provision is made for escape of the air which will accumulate at that point. (See Fig. 7.)

In the following there will be described the conditions of operation when the speed of the driving shaft 1 is transmitted in a reduced ratio. In this connection it is assumed that the pump system and the passages of the distributor casing have been filled with a suitable liquid, which will usually be oil. The driving shaft 1 is set into operation by a motor, and it will also be assumed that the casing 4, 5, 6, 7, 8 is likewise set into rotation, but at a lower circumferential velocity than the shaft 1. There is, accordingly, a relative rotation between the pump shaft 1 and the said casing. Owing to this relative rotation between the pump shaft and the casing, the pistons 3 are caused to perform a reciprocatory motion. Certain of the pump pistons suck up oil out of the space 20, 21 through the aperture 23 and the passages 24 into their cylinders, whilst the remaining pistons 3 move outwards and force the oil out of their cylinders through the passages 9 into the outer chamber 10, 11, 12 of the distributor casing 6. From this chamber 10, 11, 12 the oil flows through the passages 13 to the motor cylinders and exerts there on the motor pistons 14 an inward pressure which acts by way of the piston bolts 70 and sliding members 68, 69 on the motor eccentric 15, 16. This pressure seeks to set the motor eccentric 15, 16 into rotation. Since, however, both eccentrics 15, 16 are firmly held by the described control elements, for example, the levers 74, 75, they are unable to yield to this pressure and a reactionary force is accordingly produced, acting in the opposite direction on the casing 4, 5, 6, 7, 8, which is thus caused to perform the rotary motion which was assumed to occur in the above with reference to the conditions of operation. Immediately a motor piston 14 has reached its innermost position, the passage 17 of the distributor casing 6, corresponding to this piston 14, is caused to communicate by way of the motor slide valve 19 with the inner chamber 20, 21 of the slide valves 19, 22, and the liquid from the cylinder space of the motor pistons is thus sucked into the inner chamber 20, 21 of the slide valves 19, 22, and thence into the cylinders in which the pump pistons are performing their suction stroke.

In addition to the stated drive by reason of the reactionary force of the firmly held motor crank 15, 16, the rotatable casing also has an additional drive imparted thereto by the torque of the driving shaft 1, which torque, through the medium of the pump eccentric 2, mechanically drives the rotatable casing 4, 5, 6, 7, 8, so that the output of the rotatable casing is accordingly the result partly of direct drive and partly of hydraulic drive. As already stated, a certain quantity of oil is conveyed from the pump to the motor by reason of the comparative rotation between the casing 4, 5, 6, 7, 8 and the driving shaft 1. The amount of oil conveyed by the pump must always be equal to the amount taken over by the motor, and the circumferential velocity of the casing must be such that the motor is able to take over this quantity of oil. Naturally, the circumferential velocity of the casing cannot be very high when the eccentricity of the motor eccentric is at a maximum, as in this case the piston stroke of the motor portion is very large and the largest possible quantity of oil will already be taken over upon one revolution. The amount of oil, therefore, which can be taken over by the motor portion diminishes in the same ratio as the motor piston stroke is made smaller by adjustment of the motor eccentric, so that the casing is now able to rotate more quickly. The positive eccentricity of the motor may be progressively reduced, so that there may be obtained a corresponding increase in the circumferential velocity of the casing. At the moment when the eccentricity is equal to zero, the circumferential velocity of the casing is equal to that of the driving shaft, as the motor pistons have no further stroke and the motor is accordingly unable to take over oil. In this position of the eccentric 15, 16, the output of the driving shaft 1 to the gear casing 4, 5, 6, 7, 8 is equivalent to direct drive.

If now, the eccentricity of the motor eccentric 15, 16 is additionally adjusted beyond the zero position towards the negative side, the motor portion is unable to take over any oil from the pump portion, but pumps oil to the outer pressure chamber 10, 11, 12 of the distributor casing 6, and thence into the pressure chamber of the pump. In consequence, the casing must now assume a higher circumferential velocity than that of the driving shaft 1 in order that the oil is taken over by the pump cylinders. The operative condition in which the eccentricity of the motor eccentric 15, 16 is located on the negative side accordingly produces a speed ratio above unity. Owing to this regulation of the motor eccentric 15, 16, the transmission above unity may be increased as desired.

It will be apparent from the description that the outer chamber 10, 11, 12, which is formed by the two slide valves 19, 22, constitutes in normal operation the pressure chamber in which the oil forced by the pump to the motor possesses a much higher pressure than the oil which is sucked up from the motor into the pump, so that the inner chamber 20, 21 of the slide valves 19, 22 forms the low-pressure or suction chamber. The excess of pressure prevailing in the outer chamber 10, 11, 12 in relation to the inner chamber 20, 21 is employed in accordance with the invention on the one hand to seal the part 56, 57 of the outer periphery of the slide valves 19, 22 in relation to those parts of the bearing sleeve 43 where such seal is required, viz, in the vicinity of the openings 18, 23 leading to the suction passages of the distributor casing. To permit of lateral displacement of the slide valves in a plane, these valves must be capable of being adjusted in the direction of pressure. This is rendered possible by the operating claw 55.

The excess of pressure in the outer chamber 10, 11, 12 in relation to the suction chamber 20 is employed on the other hand to press the two slide valves with their annular end faces in oiltight fashion one against the other at 44. This is effected by the fact that the oil under pressure passes through the passages 53, 54 in the walls of the slide valves into the annular spaces 47, 48.

Disconnection of the gear takes place by lifting the one slide valve away from the other, so that in this way an open connection is produced between the outer pressure chamber 10, 11, 12 of the slide valves and the inner suction chamber 20, 21. The disconnection of the gear may be performed by hand by moving the spindle 25 (Fig. 1) together with the motor slide valve 19 connected therewith in the direction of the longitudinal axis, the slide 19 thus being moved away from the slide 22. As a result of the free connection between the pressure chamber 10, 11, 12 and the suction chamber 20, 21, the pressure from the pressure chamber 10, 11, 12 acting on the pistons of the motor is relieved, so that the driving force of the shaft 1 is unable to act hydraulically on the motor portion and accordingly on the casing.

In order to start the stationary gear slowly, it is necessary for the two separated slide valves 19, 22 to be moved together gradually. For this purpose the motor slide valve 19 is moved slowly by the hand wheel 58 and the spring 61 against the pump slide valve 22, and the passage between the pressure chamber 10, 11, 12 and the suction chamber 20, 21 thus slowly interrupted, so that, in this manner, pressure is again produced in the pressure chamber which is delivered to the motor portion. This arrangement permits of gentle starting without jolts.

The operations aforesaid have been described on the assumption that the drive takes place by means of the shaft 1 and that the output is transmitted by the driven casing 4, 5, 6, 7, 8. It will be obvious, however, that vice versa, the casing 4, 5, 6, 7, 8 may be driven, transmitting the output to the shaft 1, which is then the driven shaft.

The provision of a distributor casing between pump and motor sections which contains two rotary slide valves accommodated in the central space of this distributor casing, without other parts such as shafts for transmitting the power or for supporting the casing being passed through the latter, may also be made use of in any other type of pump and motor, in which the pump and the motor consist of cylindrical members having bores disposed parallel to the longitudinal axis of the gear and adapted to receive pistons which circulate the liquid through the distributor casing between the pump and the motor. In this construction of the pump and the motor there are employed swash plates for causing the reciprocatory motion of the pistons.

In Fig. 7 there is shown a form of embodiment of this kind comprising pistons 3 and 14 which are disposed parallel to the shafts 1 and 86. The movement of the pistons 3 is produced by an eccentric 87 and a swash plate 88. The latter is held by a Cardan joint 89, 90, 91 and 92. The same applies to the swash plate 93 of the motor part with the exception that, in this case, the eccentric 94 does not rotate. This eccentric 94 is located in a prism guide 95 secured to the shaft 86, absorbing the eccentric forces and permitting of a shifting of the eccentric along the guides 96 (perpendicularly to the plane of the drawings) for the purpose of varying the drive ratio of the transmission. This controlling movement is transmitted by a lever 97, hollow shaft 98 and bevel wheel 99 (the vertex of which is situated at 100) to the eccentric 94 carrying a bevel wheel segment 101 (Figs. 7, 8, and 9).

As this movement may be positive or negative in relation to the zero position, the shaft holding the slide valve 19 does not require to be turned for reversing the direction of rotation of the gear. In this way it is possible to adjust any desired stroke of the pistons, so that the swash plate transmission operates in exactly the same fashion as the gear previously described having radially disposed cylinders.

The invention is not intended to be limited to the two forms shown, which are to be understood as illustrative only and not as limiting, as various changes in construction and arrangement may be made, all coming within the scope of the claims which follow.

I claim:—

1. Variable speed hydraulic gear, comprising in combination a pump casing, a pump cylinder block within the said casing with borings in the said block, pistons disposed in these borings and adapted upon their movement to displace a liquid, a shaft adapted to be rotated by an external power source, driving elements which are connected with the said shaft and transmit the motion to the said pistons, a motor casing, a motor cylinder block within the said casing with borings in the said block, pistons disposed in the said motor cylinder borings and adapted to reciprocate therein, driving elements for the said motor cylinder pistons about which the said motor casing is mounted to be rotatable, means for establishing connection between the said motor piston driving elements and the said motor pistons in order to impart reciprocatory motion to the said motor pistons by the rotation of the said motor casing, means adapted to adjust the said motor piston driving elements and together therewith the stroke of the said motor pistons, a distributor casing firmly connected to the said pump casing and the said motor casing and arranged co-axial thereto, the said distributor casing having a hollow space disposed centrally therein and passages for conveying the liquid displaced by the said pump cylinder pistons into the said hollow space, slide valves arranged co-axially in the said hollow space which distribute the liquid between the said pump casing and the said motor casing and having a substantially bell-shaped form, the said slide valves in their normal position of operation bearing against each other with their annular end faces and forming by means of cavities furnished therein an external chamber and an internal chamber, whereby the said slide valves are devoid of any structural elements within the same adapted to transmit appreciable forces or to support any part of the said pump casing or the said motor casing, means in association with the slide valve pertaining to the said pump casing for holding it in the correct position in relation to the said pump piston driving elements, means in association with the slide valve pertaining to the said motor casing for holding it in the correct position in relation to the said motor piston driving elements, passages in the said distributor casing for conducting the liquid from the said hollow space in the said distributor casing to the said motor casing, means adapted always to hold the said motor slide valve and the said holding means in association therewith at the same angle in relation to the said motor piston driving elements as compared with the axis of the gear, the arrangement being such that the said pump casing, the said distributor casing and the said motor casing form a single driven rotatable unit supplying the gear output, so that the said unit receives the power from the said shaft driven by the said foreign power source, whilst the casing can also be adapted to be driven itself by the said foreign power source and transmit the power to the said shaft.

2. Variable speed hydraulic gear, comprising in combination a pump casing, a pump cylinder block within the said casing having radial borings in the said block, pistons disposed in these borings and adapted upon their movement to displace a liquid, a shaft adapted to be rotated by an external power source, at least one eccentric which is connected with the said shaft and transmits the driving motion to the said pistons, a motor casing, a motor cylinder block within the said casing having radial borings in the said block, pistons disposed in the said motor cylinder borings and adapted to reciprocate therein, two super-imposed inner and outer eccentrics about which the said motor casing is mounted to be rotatable, means for establishing connection between the said motor casing eccentrics and the said motor pistons in order to impart reciprocatory motion to the said motor pistons by the rotation of the said motor casing, means adapted to vary the relative position of the said two motor casing eccentrics and together therewith the stroke of the said motor pistons, a distributor casing firmly connected to the said pump casing and the said motor casing and arranged co-axial thereto, the said distributor casing having a hollow space disposed centrally therein, slide valves arranged co-axially in the said hollow space which distribute the liquid between the said pump casing and the said motor casing and have a substantially bell-shaped form, the said slide valve in their normal position of operation bearing against each other with their annular end faces and forming by means of cavities furnished therein an external chamber and an internal chamber, whereby the said slide valves are devoid of any structural elements within the same adapted to transmit appreciable forces or to support any part of the said pump casing or the said motor casing, means in association with the slide valve pertaining to the said pump casing for holding it in the correct position in relation to the said pump eccentric, means in association with the slide valve pertaining to the said motor casing for holding it in the correct position in relation to the said motor eccentrics, passages in the said distributor casing for conveyance of the liquid between the said pump cylinder block, the said hollow space in the distributor casing and the said motor cylinder block, and means adapted always to hold the said motor slide valve and the said holding means in association therewith at the same angle in relation to the outer axis of the said outer eccentric, the arrangement being such that the said pump casing, the said distributor casing and the said motor casing form a single rotatable unit.

3. Variable speed hydraulic gear, comprising in combination a pump casing, a pump cylinder block within the said casing having radial borings in the said block, pistons disposed in these borings and adapted upon their movement to displace a liquid, a shaft adapted to be rotated by an external power source, at least one eccentric which is connected with the said shaft and transmits the driving motion to the said pistons, a motor casing, a motor cylinder block within the said casing having radial borings in the said block, pistons disposed in the said motor cylinder borings and adapted to reciprocate therein, two super-imposed, inner and outer eccentrics of equal eccentricity about which the said motor casing is mounted to be rotatable, means for establishing connection between the said motor casing eccentrics and the said motor pistons in order to impart reciprocatory motion to the said motor pistons by the rotation of the said motor casing, elements firmly connected with the said inner eccentric and adapted to vary the position thereof, elements adapted to adjust the said outer eccentric, a sleeve firmly connected with the said outer eccentric, a clutch provided between the said outer eccentric and the said sleeve comprising a ring having prism-like parallel grooves in the outer face and similar grooves in the inner face disposed substantially vertically to the said first grooves, claws on the surface of the said sleeve directed towards the said ring and adapted to engage in the said grooves in the outer face of the said ring, claws on the side of the said outer eccentric directed towards the said ring and adapted to engage in the grooves in the inner face of the said ring, so that every simultaneous and oppositely directed rotation of equal amount of the parts causing the adjustment of the said inner and outer eccentrics causes the said eccentrics always to be moved to an equal extent but in opposite directions, so that upon this adjustment the outer axis of the said outer eccentric is always moved simultaneously in a plane, a distributor casing firmly connected to the said pump casing and the said motor casing and arranged co-axial thereto, the said distributor casing having a hollow space disposed centrally therein, slide valves arranged co-axially in the said hollow space which distribute the liquid between the said pump casing and the said motor casing and have a substantially bell-shaped form, the said slide valves in their normal position of operation bearing against each other with annular end faces and forming by means of cavities furnished therein an external chamber and an internal chamber, whereby the said slide valves are devoid of any structural elements within the same adapted to transmit appreciable forces or to support any part of the said pump casing or the said motor casing, means in association with the slide valve pertaining to the said pump casing for holding it in the correct position in relation to the said pump eccentric, means in association with the slide valve pertaining to the said motor casing for holding it in the correct position in relation to the said motor eccentrics, passages in the said distributor casing for conveyance of the liquid between the said pump cylinder block, the said hollow space in the distributor casing and the said motor cylinder block, the arrangement being such that the said pump casing, the said distributor casing and the said motor casing form a single rotatable unit.

4. Variable speed hydraulic gear, comprising in combination a pump casing, a pump cylinder block within the said casing having radial borings in the said block, pistons disposed in these borings and adapted upon their movement to displace a liquid, a shaft adapted to be rotated by an external power source, at least one eccentric which is connected with the said shaft and transmits the driving motion to the said pistons, a motor casing, a motor cylinder block within the said casing having radial borings in the said block, pistons disposed in the said motor cylinder borings and adapted to reciprocate therein, two super-imposed, inner and outer eccentrics about which the said motor casing is mounted to be rotatable, means for establishing connection between the said motor casing eccentrics and the said motor pistons in order to impart reciprocatory motion to the said motor pistons by the rotation of the said motor casing, means adapted to vary the relative position of the said two motor casing eccentrics and together therewith the stroke of the said motor pistons, two spaced bearings for the said eccentrics in the said pump casing and the said motor casing, the said bearings forming between them an annular hollow space, the said eccentrics having in the said space between the said bearings a cavity extended in the direction of the axis of the gear, cross-head guides which assist with other means in establishing connection between the said eccentrics and the said pistons, the arrangement being such that the cross-head guides are approached very near to the axis of the gear, a distributor casing firmly connected to the said pump casing and the said motor casing and arranged co-axial thereto, the said distributor casing having a hollow space disposed centrally therein, slide valves arranged co-axially in the said hollow space which distribute the liquid between the said pump casing and the said motor casing and have a substantially bell-shaped form, the said slide valves in their normal position of operation bearing against each other with annular end faces and forming by means of cavities furnished therein an external chamber and an internal chamber, whereby the said slide valves are devoid of any structural elements within the same adapted to transmit appreciable forces or to support any part of the said pump casing or the said motor casing, means in association with the slide valve pertaining to the said pump casing for holding it in the correct position in relation to the said pump piston eccentric, means in association with the slide valve pertaining to the said motor casing for holding it in the correct position in relation to the said motor eccentrics, passages in the said distributor casing for conveyance of the liquid between the said pump cylinder block, the said hollow space in the distributor casing and the said motor cylinder block, and means adapted always to hold the said motor slide valve and the said holding means in association therewith at the same angle in relation to the outer axis of the said outer motor eccentric, the arrangement being such that the said pump casing, the said distributor casing and the said motor casing form a single rotatable unit.

5. In an hydraulic gear as claimed in claim 1, the pump cylinder block having borings therein disposed axially to the axis of the gear, a swash plate connected with the shaft adapted to be rotated by an external power source and transmitting the driving motion to the said pump cylinder pistons, the motor cylinder block having borings therein disposed axially to the axis of the gear, an adjustable swash plate adapted to drive the motor cylinder pistons and about which the said motor casing is mounted to be rotatable, means for establishing connection between the said motor piston swash plate for imparting reciprocatory motion to the said motor pistons by the rotation of the said motor casing, means adapted to vary the inclined position of the said swash plate and accordingly the stroke of the said motor pistons, and means adapted always to hold the motor slide valve and the holding means associated therewith at the same angle in relation to the swash plate.

6. In an hydraulic gear as claimed in claim 1, in which said slide valves have on a part of their outer periphery recesses adapted to form an external chamber, the said chamber also being constituted in part by an adjacent annular recess in the said slide valves in the vicinity of the plane in which the said slide valves contact.

7. In an hydraulic gear as claimed in claim 1, in which said slide valves have on a part of their outer periphery recesses forming in conjunction with an annular recess in the said slide valves in the vicinity of the plane in which the said slide valves contact an external chamber, and an enlargement of the annular end faces of the said slide valves in the said plane, and having a distributor casing having an annular recess in the said plane surrounding the said enlargement and forming a space connecting the annular recesses in the said slide valves.

8. In an hydraulic gear as claimed in claim 1, having means in association with the said slide valves for holding them in the correct position, the diameter of the said holding means being smaller than the outer diameter of the said slide valves so as to form hollow annular spaces at the rear of the said slide valves, said spaces communicating with the outer chamber, the said holding means being passed in close-fitting fashion through the distributor casing.

9. In an hydraulic gear as claimed in claim 1, means in association with the said slide valves for holding them in the correct position, operative means for selectively rotating and holding the said slide valves, a bearing sleeve for the said slide valves in the said distributor casing, and claws adapted to establish connection between the said holding means and the said operative means, the said claws being so constructed that the said slide valves are able to yield to lateral liquid pressures which press the said slide valves against the mouths of passages provided in the said distributor casing.

10. In an hydraulic gear as claimed in claim 1, having a spindle connected with the said motor slide valve adapted to shift the said motor slide valve in the direction of its longitudinal axis and accordingly to move the said motor slide valve out of contact with the said pump slide valve, and elements on the said spindle adapted in normal operation to press the said spindle and accordingly the said motor slide valve against the annular face of the said pump slide valve.

11. In a variable speed hydraulic power transmission, a casing, means for supporting said casing for rotation about an axis, power supply means extending into said casing and mounted for rotation about said axis, pump cylinder bores formed in said casing, pump pistons therein, means between said power supply means and said pistons for reciprocating said pistons within said cylinder bores upon the occurrence of relative rotative movement between said casing and said power supply means, motor cylinder bores formed in said casing, motor pistons therein, a support, means between said support and said motor pistons for reciprocating said motor pistons within their cylinder bores upon the occurrence of relative rotative movement between said casing and said support, channels and valve means so constructed and arranged as to cause the pump cylinders in which the pistons are moving into their cylinders to communicate with the motor cylinders whose pistons are moving outwardly of their cylinders, and to cause the motor cylinders whose pistons are moving into the cylinders to communicate with the pump cylinders whose pistons are moving outwardly of their cylinders, the said valve means comprising a cup-shaped member mounted for rotation relative to said casing and for rotation with said power supply means and a second cup-shaped member co-axial therewith and mounted in non-rotative relation to said support, the edges of said cup-shaped members bearing against each other and forming a hollow cavity, and power take-off means connected with said casing.

12. In a variable speed hydraulic power transmission, a casing, means for supporting said casing for rotation about an axis, power supply means extending into said casing and mounted for rotation about said axis, pump cylinder bores formed in said casing, pump pistons therein, means between said power supply means and said pistons for reciprocating said pistons within said cylinder bores upon the occurrence of relative rotative movement between said casing and said power supply means, motor cylinder bores formed in said casing, motor pistons therein, a support, means between said support and said motor pistons for reciprocating said motor pistons within their cylinder bores upon the occurrence of relative rotative movement between said casing and said support, channels and valve means so constructed and arranged as to cause the pump cylinders in which the pistons are moving into their cylinders to communicate with the motor cylinders whose pistons are moving outwardly of their cylinders, and to cause the motor cylinders whose pistons are moving into the cylinders to communicate with the pump cylinders whose pistons are moving outwardly of their cylinders, the said valve means comprising a cup-shaped member mounted for rotation relative to said casing and for rotation with said power supply means and a second cup-shaped member co-axial therewith and mounted in non-rotative relation to said support, the edges of said cup-shaped members bearing against each other and forming a hollow cavity, and means for sliding one of said cup-shaped members away from the other, and power take-off means connected with said casing.

13. In a variable speed hydraulic power transmission, a casing, means for supporting said casing for rotation about an axis, power supply means extending into said casing and mounted for rotation about said axis, pump cylinder bores formed in said casing, pump pistons therein, means between said power supply means and said pistons for reciprocating said pistons within said cylinder bores upon the occurrence of relative rotative movement between said casing and said power supply means, motor cylinder bores formed in said casing, motor pistons therein, a support, means between said support and said motor pistons for reciprocating said motor pistons within their cylinder bores upon the occurrence of relative rotative movement between said casing and said support, channels and valve means so constructed and arranged as to cause the pump cylinders in which the pistons are moving into their cylinders to communicate with the motor cylinders whose pistons are moving outwardly of their cylinders, and to cause the motor cylinders whose pistons are moving into the cylinders to communicate with the pump cylinders whose pistons are moving outwardly of their cylinders, the said valve means comprising a cup-shaped member mounted for rotation relative to said casing and for rotation with said power supply means and a second cup-shaped member co-axial therewith and mounted in non-rotative relation to said support, the edges of said cup-shaped members bearing against each other and forming a hollow cavity, and a port in each of said cup-shaped members communicating with its interior and adapted to communicate with the pump and motor cylinders respectively, and power take-off means connected with said casing.

14. In a variable speed hydraulic power transmission, a casing, means for supporting said casing for rotation about an axis, power supply means extending into said casing and mounted for rotation about said axis, pump cylinder bores formed in said casing, pump pistons therein, means between said power supply means and said pistons for reciprocating said pistons within said cylinder bores upon the occurrence of relative rotative movement between said casing and said power supply means, motor cylinder bores formed in said casing, motor pistons therein, a support, means between said support and said motor pistons for reciprocating said motor pistons within their cylinder bores upon the occurrence of relative rotative movement between said casing and said support, channels and valve means so constructed and arranged as to cause the pump cylinders in which the pistons are moving into their cylinders to communicate with the motor cylinders whose pistons are moving outwardly of their cylinders, and to cause the motor cylinders whose pistons are moving into the cylinders to communicate with the pump cylinders whose pistons are moving outwardly of their cylinders, said valve means comprising a cup-shaped member mounted for rotation relative to said casing and for rotation with said power supply means and a second cup-shaped member co-axial therewith and mounted in non-rotative relation to said support, the edges of said cup-shaped members bearing against each other and forming a hollow cavity, a port in each of said cup-shaped members communicating with its interior and adapted to communicate with the pump and motor cylinders respectively, and a recess formed on the exterior of each of said cup-shaped members so constructed and arranged as to form a passage connecting with the pump and motor cylinders respectively, and power take-off means connected with said casing.

15. Variable speed hydraulic gear, comprising in combination a pump casing, a pump cylinder block within the said casing with borings in the said block, pistons disposed in these borings and adapted upon their movement to displace a liquid, power supply means extending into the said casing, means between said power supply means and said pistons for reciprocating said pistons within said cylinder borings, a motor casing, a motor cylinder block within the said casing with borings in the said block, pistons disposed in the said motor cylinder borings, driving elements for the said motor cylinder pistons, means for establishing connection between the said motor piston driving elements and the said motor pistons in order to impart reciprocatory motion to the said motor pistons, a distributor casing firmly connected to the said pump casing and the said motor casing and arranged co-axially thereto, the said distributor casing having a hollow space disposed centrally therein and passages for conveying the liquid displaced by the said pump cylinder pistons into the said hollow space, slide valves arranged co-axially in the said hollow space which distribute the liquid between the said pump casing and the said motor casing and having a substantially bell-shaped form and forming by means of cavities provided therein an external chamber and an internal chamber, the said chambers also being constituted in part by an adjacent annular recess in the vicinity of the plane in which the said slide valves contact, the annular end faces of the said slide valves showing an enlargement in the plane of contact, means for holding the slide valves in the correct position relatively to their driving elements, the diameter of this holding means being smaller than the outer diameter of the said slide valves so as to form hollow annular spaces at the rear side of the said slide valves, said spaces communicating with the external chamber, the said holding means being passed in close-fitting fashion through the distributor casing, passages in the said distributor casing for conducting the liquid from the said hollow space in the said distributor casing to the said motor casing, means adapted always to hold the said motor slide valve and the holding means in association therewith at the same angle in relation to the said motor piston driving elements as compared with the axis of the gear, the arrangement being such that the said pump casing, the said distributor casing and the said motor casing form a single driven unit.

BERNHARD BISCHOF.